(12) United States Patent
Yano

(10) Patent No.: US 12,345,566 B2
(45) Date of Patent: Jul. 1, 2025

(54) SENSING RANGE LIMITING DEVICE

(71) Applicant: NEC Corporation, Tokyo (JP)

(72) Inventor: Yutaka Yano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 346 days.

(21) Appl. No.: 17/795,017

(22) PCT Filed: Dec. 28, 2020

(86) PCT No.: PCT/JP2020/049076
§ 371 (c)(1),
(2) Date: Jul. 25, 2022

(87) PCT Pub. No.: WO2021/153142
PCT Pub. Date: Aug. 5, 2021

(65) Prior Publication Data
US 2023/0058701 A1    Feb. 23, 2023

(30) Foreign Application Priority Data
Jan. 30, 2020    (JP) .................................. 2020-013945

(51) Int. Cl.
*G01H 9/00*    (2006.01)
*G01D 5/26*    (2006.01)
(Continued)

(52) U.S. Cl.
CPC .............. *G01H 9/004* (2013.01); *G01D 5/268* (2013.01); *G01D 5/35361* (2013.01); *G08C 23/06* (2013.01)

(58) Field of Classification Search
CPC .... G01D 5/268; G01D 5/35361; G01H 9/004; G08C 15/00; G08C 23/06
See application file for complete search history.

(56) References Cited

U.S. PATENT DOCUMENTS

2005/0002017 A1    1/2005    Haran
2010/0158431 A1    6/2010    Huffman et al.
(Continued)

FOREIGN PATENT DOCUMENTS

GB    2126820 A    3/1984
JP    H02-145932 A    6/1990
(Continued)

OTHER PUBLICATIONS

International Search Report for PCT Application No. PCT/JP2020/049076, mailed on Mar. 2, 2021.
(Continued)

*Primary Examiner* — Daniel Petkovsek

(57) ABSTRACT

An optical fiber sensing range limiting device comprises: a blocking unit that, on the basis of a control signal and for a prescribed period, causes probe light that has been sent to an optical fiber used in optical fiber sensing and has returned from the optical fiber to be blocked from being transmitted to a light detection unit, or causes a detection signal that is detected with respect to the return light to be blocked from being transmitted to a downstream processing unit; and a control unit that outputs the control signal to the blocking unit. The prescribed period includes a period corresponding to the positional range for which acquisition of information from the detection signal is prohibited or for which it is undesirable to acquire the information.

14 Claims, 11 Drawing Sheets

(51) Int. Cl.
    *G01D 5/353*     (2006.01)
    *G08C 23/06*     (2006.01)

(56) References Cited

U.S. PATENT DOCUMENTS

| 2015/0062563 A1 | 3/2015 | Ahadian et al. |
| 2015/0172449 A1 | 6/2015 | Clavenna, II et al. |
| 2019/0331550 A1* | 10/2019 | Bussieres ........... G01M 11/3145 |

FOREIGN PATENT DOCUMENTS

| JP | 2000-283884 A | 10/2000 |
| WO | 2013/114128 A1 | 8/2013 |
| WO | 2018/085893 A1 | 5/2018 |

OTHER PUBLICATIONS

English translation of Written opinion for POT Application No. PCT/JP2020/049076, mailed on Mar. 2, 2021.
R. Posey Jr et al., "Strain sensing based on coherent Rayleigh scattering in an optical fibre", Electronics Letters, Sep. 28, 2000, vol. 36, No. 20.
Jiro, Makino, ed., "Guidebook for Digital Signature Application", Denshi Shomei Katsuyou Gaido (in Japanese) (Second Edition), issued by Certification Authority Conference, Sep. 2013, [Retrieval date: Jan. 8, 2020], the Internet http://www.c-a-c.jp/download/guidebook.html.
JP Office Action for JP Application No. 2021-574560, mailed on May 30, 2023 with English Translation.

\* cited by examiner

SENSING RANGE LIMITING DEVICE

This application is a National Stage Entry of PCT/JP2020/049076 filed on Dec. 28, 2020, which claims priority from Japanese Patent Application 2020-013945 filed on Jan. 30, 2020, the contents of all of which are incorporated herein by reference, in their entirety.

TECHNICAL FIELD

The present invention relates to optical fiber sensing.

BACKGROUND ART

Distributed optical fiber sensing is a publicly known technique in which an installed optical fiber is used as a distributed sensing element for acquiring environment information indicating environment surrounding the optical fiber.

The environment information is generally information indicating presence of vibration including an acoustic sound. Note that, in the present specification, an acoustic sound is included in vibration. In addition, the environment information contains an environment temperature, a pressure, and the like. In consideration of ease of understanding, a case where the environment information is information indicating presence of vibration will be mainly described below.

For example, optical fiber sensing is for acquiring, as the environment information, a disturbance (dynamic distortion) acting on a sensing optical fiber by causing coherent light to enter the sensing optical fiber and detecting and analyzing return light from each part of the sensing optical fiber. In general, such a disturbance is vibration of the sensing optical fiber which is caused by an acoustic wave or the like transmitted to a part of the sensing optical fiber. When such information that at least indicates presence of vibration at a part of the sensing optical fiber is acquired as the environment information, optical fiber sensing is referred to as distributed acoustic sensing (DAS).

For example, a principle of DAS is disclosed in PTL 1 and NPL 1. DAS is a kind of sensing method adopting OTDR type. Herein, OTDR is an abbreviation for optical time-domain reflectometry.

FIGS. 1A-1B are explanatory diagrams of an operation of a general OTDR-type optical fiber sensing system. FIG. 1A is an explanatory diagram of a main configuration of the sensing system. Further, FIG. 1B is an image diagram illustrating a state of probe light and backward scattered light thereof in the sensing system.

As illustrated in FIG. 1A, the OTDR-type optical fiber sensing system includes an interrogator 100 and an optical fiber 200. The interrogator 100 transmits probe light 900 to the optical fiber 200 being a sensing optical fiber. The probe light 900 moves to the right through the optical fiber 200, and backward scattered light such as backward scattered light 801 or 802 is generated at each position of the optical fiber 200 in a process of the movement. In general, the backward scattered light is Rayleigh backward scattered light. The backward scattered light moves to the left through the optical fiber 200 toward the interrogator 100, and enters the interrogator 100. The backward scattered light generated at each position of the optical fiber 200 is affected by an environment surrounding the position. The environment, for example, indicates a temperature or presence of vibration, such as an acoustic sound, at the position.

The interrogator 100 detects a degree at which return light of the backward scattered light is affected for each cable distance of the optical fiber 200.

Subsequently, the interrogator 100 derives environment information relating to an environment for each cable distance of the optical fiber 200, based on the information detected from the return light. For example, the environment information is information indicating a vibration status of the optical cable.

It has been known that, when DAS being a kind of the OTDR-type optical fiber sensing system is used, environment information can be acquired for every several meters in a laid range of the optical fiber, which is a section of 40 km or longer. Thus, when a cable being laid on land or on the sea floor is utilized, and DAS is applied thereto, environment information relating to a wide range can be acquired.

FIG. 2 is a schematic diagram illustrating a configuration example of a DAS system 300 being a kind of the OTDR-type optical fiber sensing system described with reference to FIGS. 1A and 1B. The DAS system 300 includes an interrogator 100 and an optical fiber 200.

The optical fiber 200 is a general optical fiber, and is included in a cable such as a submarine cable and a land cable. A general optical fiber generates backward scattered light being affected by a change of an environment such as presence of vibration including an acoustic sound. In general, the backward scattered light is generated due to Rayleigh backward scattering. In this case, the change is mainly a change of a phase (phase change).

The optical fiber 200 may be a plurality of optical fibers connected to one another by an amplification relay device or the like. A cable including the optical fiber 200 may be connected between an optical communication device including the interrogator 100, which is not illustrated, and another optical communication device that performs optical communication via the optical fiber 200.

The interrogator 100 includes a processing unit 101, an AD conversion unit 108, a synchronization control unit 109, a light source unit 103, a modulation unit 104, and a detection unit 105. Herein, AD is an abbreviation for Analog to Digital. The modulation unit 104 is connected to the optical fiber 200 via an optical fiber 201 and an optical coupler 211, and the detection unit 105 is connected to the optical fiber 200 via the optical coupler 211 and an optical fiber 202.

The light source unit 103 includes a laser light source, and causes continuous laser light to enter the modulation unit 104.

The modulation unit 104 synchronizes with a trigger signal from the synchronization control unit 109, performs, for example, amplitude modulation for the laser light being continuous light incident from the light source unit 103, and generates probe light having a sensing signal wavelength. For example, the probe light is in a pulse state. Then, the modulation unit 104 transmits the probe light to the optical fiber 200 via the optical fiber 201 and the optical coupler 211.

Further, the synchronization control unit 109 transmits a trigger signal to the processing unit 101, and delivers a time original point in data that are continuously subjected to analog/digital (A/D) conversion and are input.

After the transmission, return light from each position of the optical fiber 200 arrives at the detection unit 105 from the optical coupler 211 via the optical fiber 202. The return light from each position of the optical fiber, which is closer to the interrogator 100, arrives at the interrogator 100 in a shorter period after the transmission of the probe light. Further, when a certain position of the optical fiber 200 is affected by an environment such as presence of an acoustic sound, the environment causes a change in the backward scattered light generated at the position, from the probe light at the time of transmission. When the backward scattered light is Rayleigh backward scattered light, the change is mainly a phase change.

The return light in which the phase change is caused is detected by the detection unit 105. Methods for the detection include publicly known synchronous detection and delay detection, and any of the methods may be used. For example, delay detection is used in a method disclosed in NPL 1. A configuration for performing phase detection is publicly known, and hence description therefor is omitted herein. An electric signal (detection signal) acquired through the detection indicates a degree of the phase change in an amplitude or the like. The electric signal is input to the AD conversion unit 108.

The AD conversion unit 108 converts the above-mentioned electric signal after detection, which is an analog signal, into digital data. The digital data are input to the processing unit 101.

The synchronization control unit 109 transmits a trigger signal to the processing unit 101, and delivers a time original point in the data that are continuously subjected to AD conversion and are input.

For example, the processing unit 101 derives data having a shape similar to a shape in which dot-like electric sensors are virtually arrayed in a row, at points of the optical fiber 200. By further processing the data as appropriate, the processing unit 101 further generates data.

The processing unit 101 outputs those pieces of the acquired data to an output unit 106 such as a display, or stores the data in a storage unit 102 such as a storage device.

For example, in a case where the processing unit 101 and the synchronization control unit 109 are central processing units of a computer, the units are operated by software containing a program and information. The program and the information required for operating the processing unit 101 and the synchronization control unit 109 are held in advance in an unillustrated memory or the like (a memory or a storage unit) in the processing unit 101 and the synchronization control unit 109. Further, the processing unit 101 and the synchronization control unit 109 may store predetermined information in an unillustrated memory or the like in the processing unit 101 and the synchronization control unit 109. Moreover, the processing unit 101 and the synchronization control unit 109 are capable of reading out the information stored in the memory or the like.

CITATION LIST

Patent Literature

[PTL 1] GB Patent No. 2126820

Non Patent Literature

[NPL 1] R. Posey Jr, G. A. Johnson and S. T. Vohra, "Strain sensing based on coherent Rayleigh scattering in an optical fibre", ELECTRONICS LETTERS, 28th Sep. 2000, Vol. 36, No. 20

[NPL 2] Jiro, Makino, ed. [Guidebook for Digital Signature Application] Denshi Shomei Katsuyou Gaido (in Japanese) (Second Edition), issued by Certification Authority Conference, Sep. 2013, [Retrieval date: Jan. 8, 2020], the Internet (http://www.c-a-c.jp/download/guidebook.html)

SUMMARY OF INVENTION

Technical Problem

However, when the distributed optical fiber sensing system technique as described above is used, the optical fiber being a communication medium running throughout a wide range also has a function as a distributed sensor element, which enables acquisition of environment information in a wide range. Thus, in some cases, an area that can be sensed (positional range) may include an area where a government, a municipal corporation, or the like regulates sensing activities. As a method for solving this problem, a method of deleting data within a regulated area (area for which acquisition is undesirable) from among the temporarily-acquired data is considered. However, this method may have a risk of leakage of data before deleting processing to the outside. It is desired that data in an area for which acquisition is undesirable are not acquired from an original signal stage.

An object of the present invention is to provide a sensing range limiting device and the like that are capable of not acquiring optical fiber sensing data within a positional range for which acquisition is undesirable, at an original signal stage.

Solution to Problem

A sensing range limiting device according to the present invention includes: a blocking unit that blocks transmission of return light to a light detection unit or transmission of a detection signal to a downstream processing unit, based on a control signal, for a predetermined period, the return light being relevant to probe light transmitted to an optical fiber to be used for optical fiber sensing and being from the optical fiber, the detection signal being a signal detected with respect to the return light; and a control unit that outputs the control signal to the blocking unit, wherein the predetermined period includes a period for which acquisition of information from the detection signal is forbidden or a period associated with a positional range for which the acquisition is undesirable.

Advantageous Effects of Invention

The sensing range limiting device and the like according to the present invention are capable of not acquiring optical fiber sensing data within a positional range for which acquisition is undesirable, at an original signal stage.

EXAMPLE EMBODIMENT

In an example embodiment, description is made while giving a DAS system as an example, which is a typical example of an OTDR-type optical fiber sensing system.

Figure 3A:
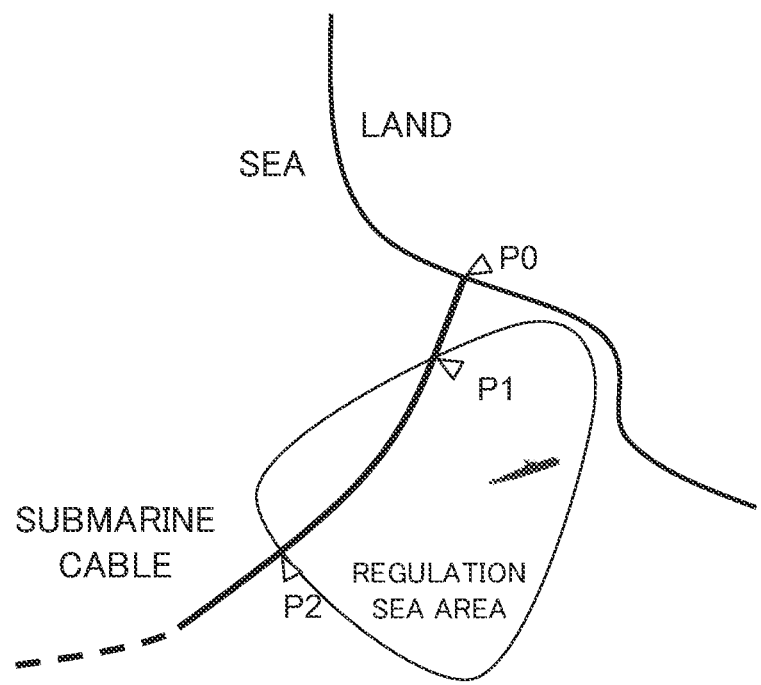
FIGS. 3A-3B are explanatory diagrams of an operation for preventing acquisition of information relating to a regulation area in the DAS system.
Figure 3B:
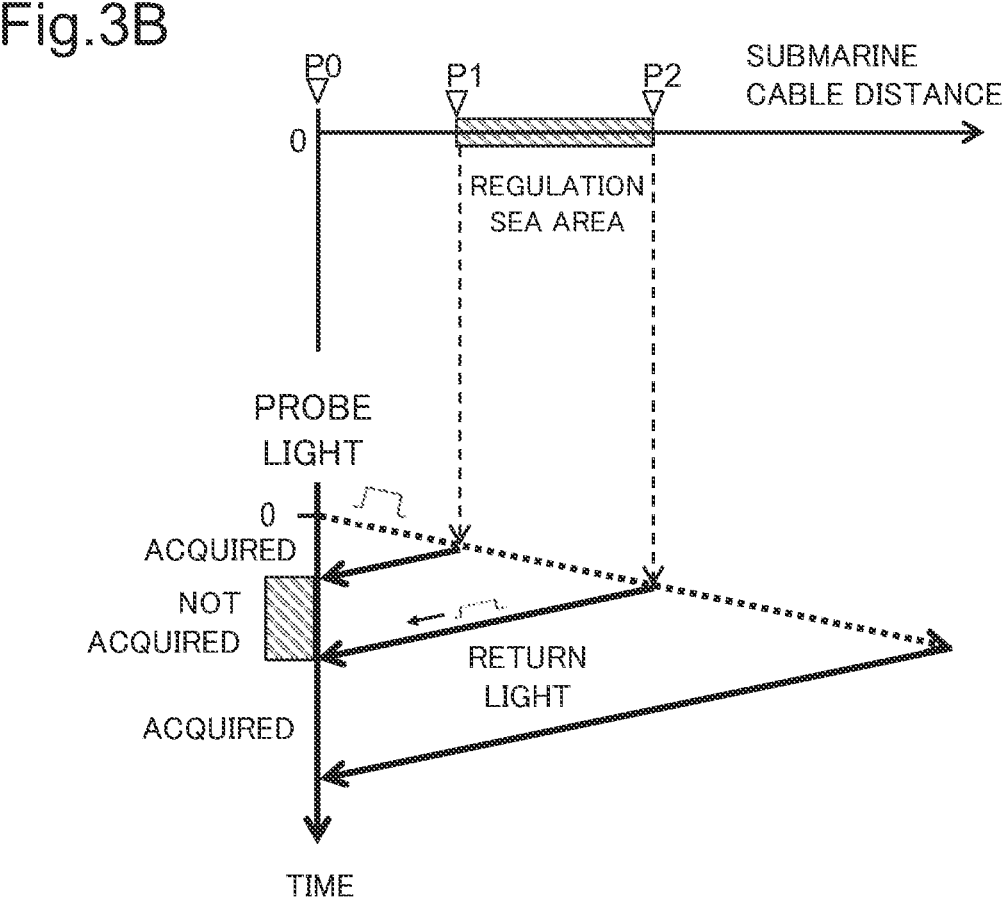

FIGS. 3A-3B are image diagrams illustrating a typical example of an operation executed by the DAS system according to the present example embodiment. FIG. 3A is an image diagram illustrating a way of installing a submarine cable including a sensing optical fiber of the DAS system. Further, FIG. 3B is an image diagram illustrating a state of return light of backward scattered light in the DAS system according to the present example embodiment.

As illustrated in FIG. 3A, the submarine cable is laid on the sea side from a position P0 being a landing point. An interrogator connected to the submarine cable, which is not illustrated, is provided at the position P0 being a landing point, and the interrogator enables acquisition of information on an environment surrounding the submarine cable. A sea area for which acquisition of environment information is regulated is set in the sea, and a section of a cable distance from P1 to P2, which is a part of the submarine cable, passes through the regulation sea area. The regulation sea area is a sea area where, for example, military activities possibly take place, and acquisition of environment information indicating activities of marine vessels, submarines, and the like is regulated.

The submarine cable is laid across the regulation sea area. Further, the submarine cable is laid in the regulation sea area associated with the submarine cable distance from P1 to P2. Herein, the submarine cable distance is a distance along the submarine cable from the cable landing point P0 at which the interrogator is installed.

As illustrated in FIG. 3B, the optical fiber sensing system according to the present example embodiment does not acquire return light of backward scattered light for probe light, which is transmitted to the optical cable from the interrogator, in the submarine cable distance from P1 to P2. Meanwhile, the optical fiber sensing system according to the present example embodiment acquires return light in the submarine cable distance from 0 (relevant to the landing point P0) to P1 and farther from P2.

With this, the optical fiber sensing system according to the present example embodiment does not acquire the environment information regarding the regulation sea area.

In the following description, acquisition of information on a specific part is prevented by blocking transmission of the information on the specific part in the device, which is referred to as "mask" of the information.

First Example Embodiment

Figure 4:
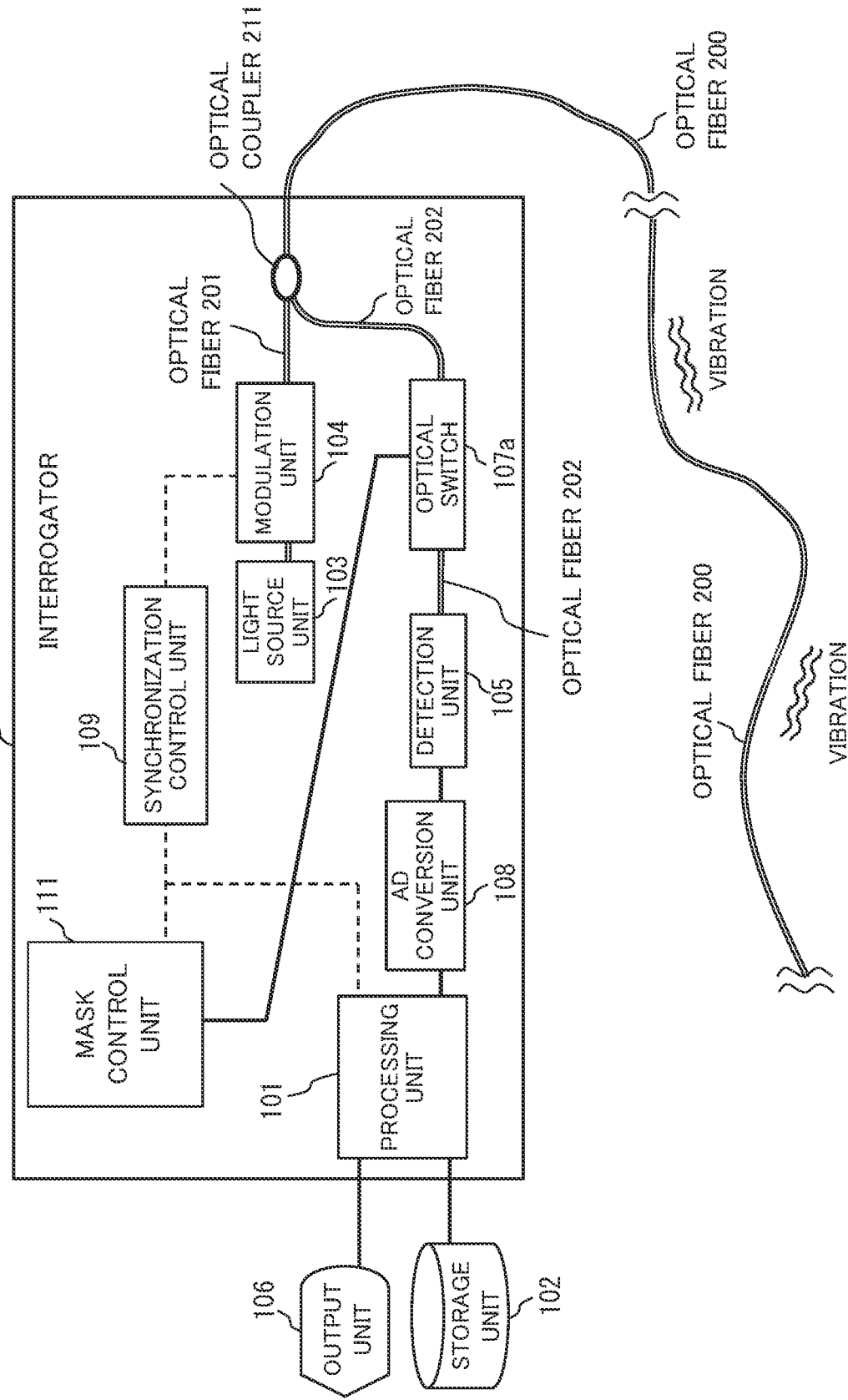
FIG. 4 is a schematic diagram illustrating a configuration example of a DAS system according to a first example embodiment.

FIG. 4 is a schematic diagram illustrating a configuration of the DAS system 300 being an example of an optical fiber sensing system according to a first example embodiment.

Figure 1A:
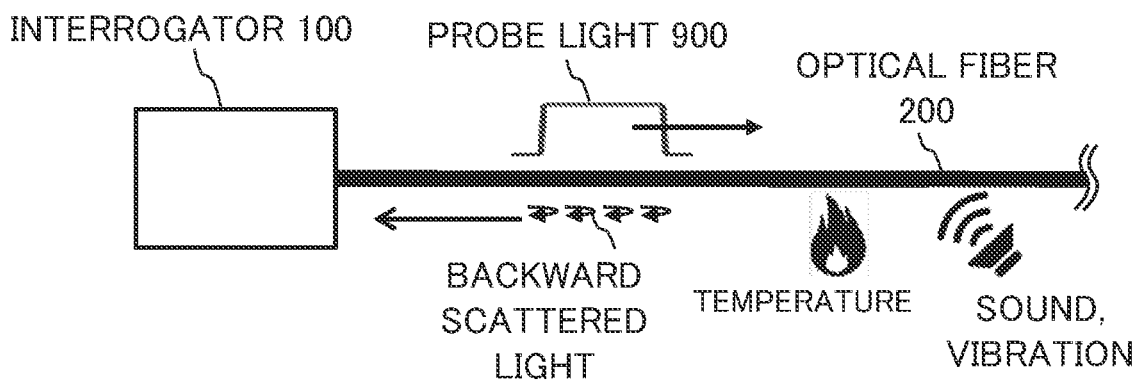
FIGS. 1A-1B are explanatory diagrams of an operation of a general OTDR-type optical fiber sensing system.
Figure 1B:
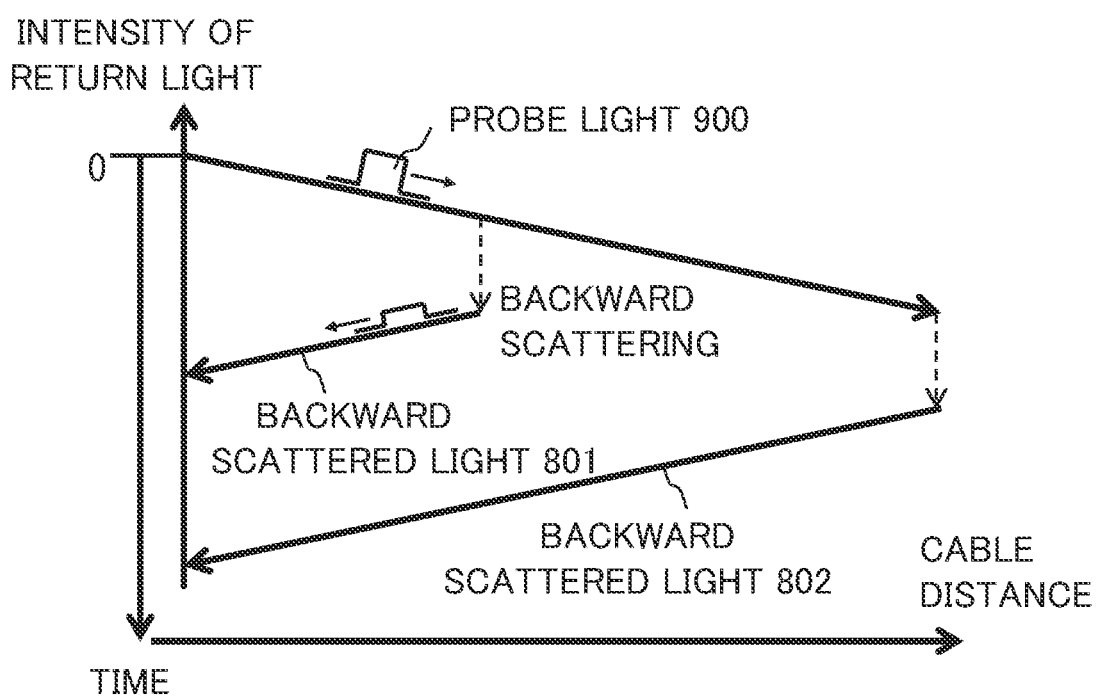
Figure 2:
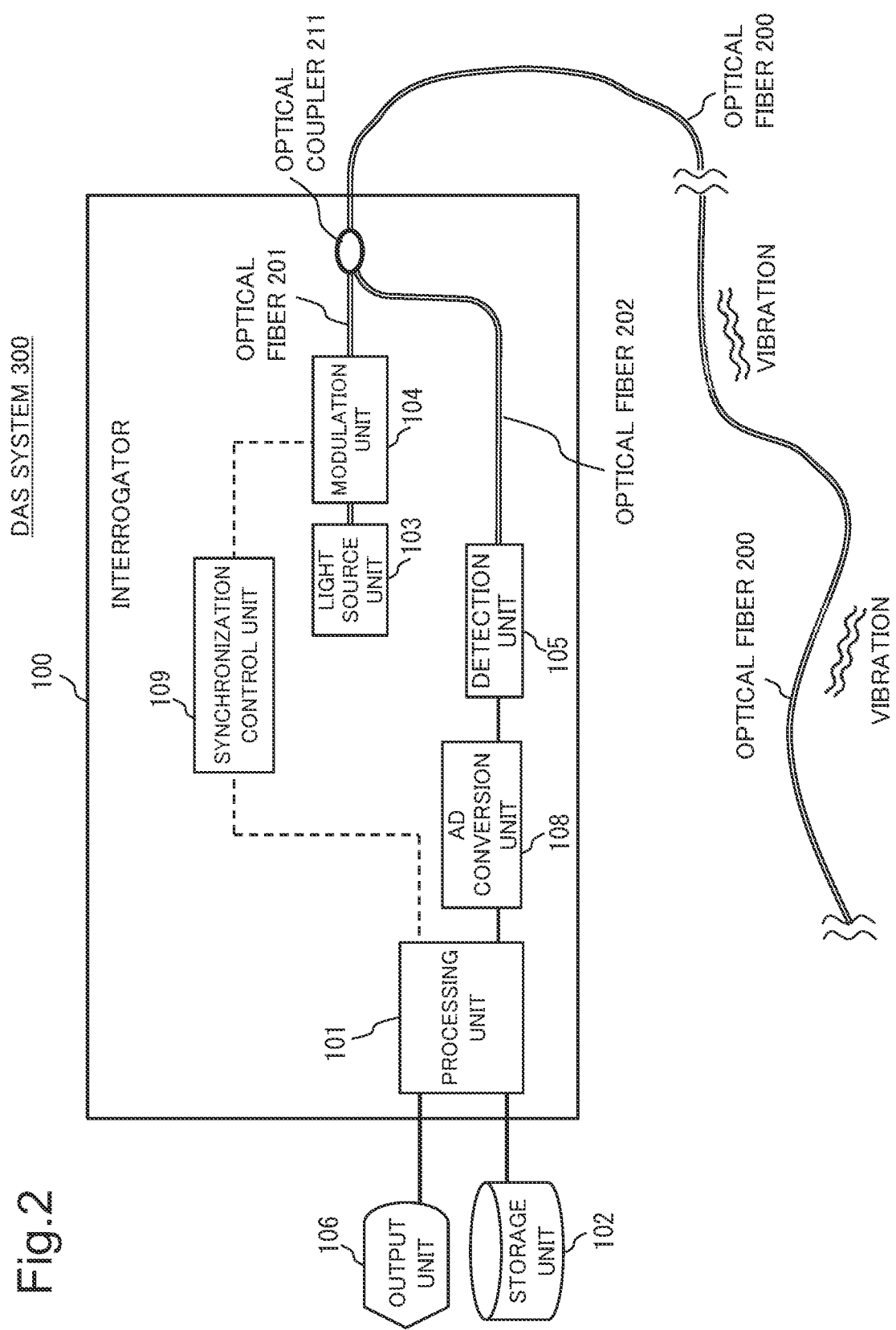
FIG. 2 is a configuration diagram of a general DAS system.

The DAS system 300 illustrated in FIG. 4 is acquired by providing an optical switch 107a in the middle of the optical fiber 202 of the DAS system 300 illustrated in FIG. 2. The DAS system 300 illustrated in FIG. 4 is different from the DAS system 300 illustrated in FIG. 2 in the following points. In the following description, description will be mainly made on differences between the DAS system 300 illustrated in FIG. 4 and that in FIG. 2.

The optical switch 107a is driven by a control signal transmitted from a mask control unit 111. The optical switch preferably reacts at high speed with less polarization dependency. Examples of such an optical switch include a MEMS-type Variable Optical Attenuator (MEMS VOA). Herein, MEMS is an abbreviation for Micro Electro Mechanical Systems.

Figure 5:
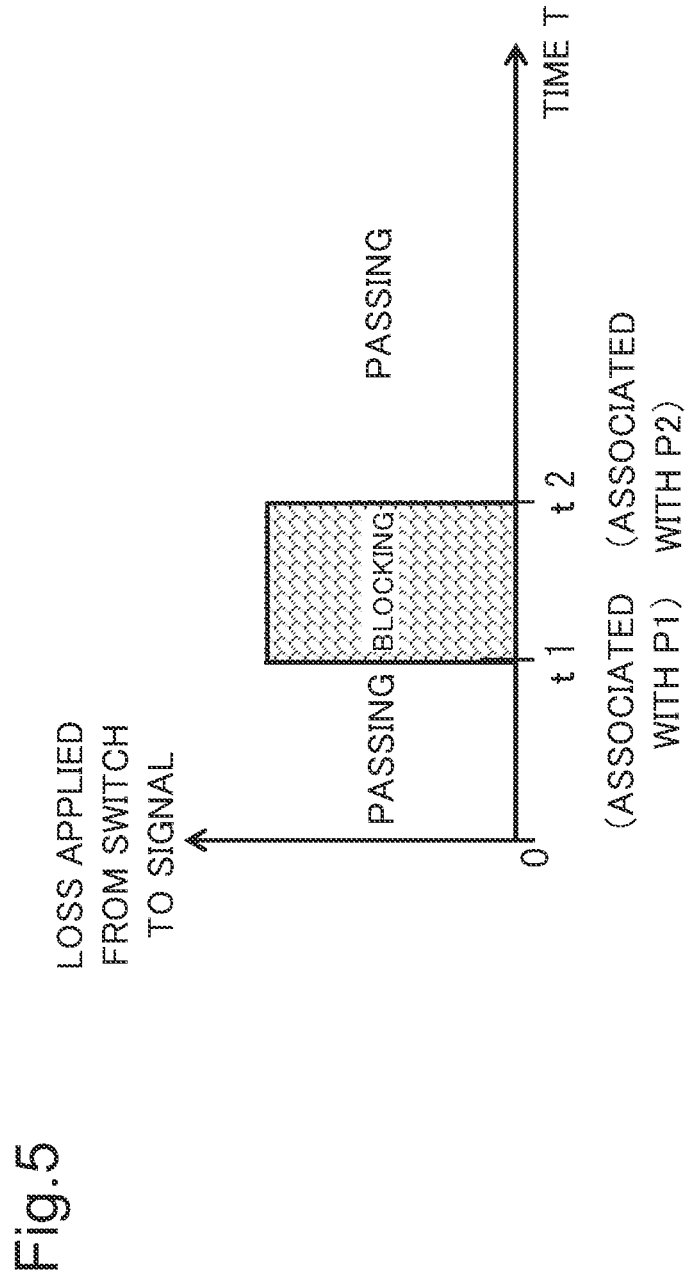
FIG. 5 is an explanatory diagram illustrating an operation example of a switch for blocking an input of information relating to a predetermined section.

FIG. 5 is an explanatory diagram illustrating a timing at which the mask control unit 111 controls the optical switch 107a. The mask control unit 111 receives information indicating an emission timing of the probe light (time T=0) from the synchronization control unit 109, and drives the optical switch 107a in such a way to block return light from a time T=t1 to a time T=t2. Herein, the time t1 and the time t2 are the times at which return light from boundary points with the regulation area arrives at the interrogator. The time t1 is associated with an arrival time of return light from a boundary point closer to the interrogator, and the time t2 is associated with an arrival time of return light from a boundary point farther from the interrogator. Therefore, return light from the time t1 to the time t2 contains information on the regulation area, and is return light from a section to be masked. The mask control unit 111 performs an operation of causing the optical switch 107a to block entry of the return light of the masked section into the detection unit 105.

The time t1 and the time t2 can be changed by setting the mask, and are set by, for example, causing the interrogator to read a mask setting file (setting information) to be described later. Before reading an effective mask setting file, it is desired that the mask control unit 111 not let the light pass.

It is desired that setting values of at least the following two items that form a pair be designated as mask setting items as described above.

(1) A mask execution condition. (2) A positional range on the cable as a mask target (a starting position and an end position).

Further, the number of mask setting pairs is not limited to one, and a plurality of pairs may be designated for one sensing cable.

The mask execution condition in (1) is a condition for activating the mask. For example, the setting values of the mask execution condition are values associated to "all times", a "designated period", and "information on a factor outside of a transmitting and receiving device". "All times" indicates that the mask is in effect at all times. The "designated period" is an execution condition for designating a period, for example, from Mar. 15, 2020, to July 10 in the same year when the mask is in effect. The "information on a factor outside of a transmitting and receiving device"

indicates a condition where the mask is activated when, for example, an amount of solar radiation in the vicinity of the installation location of the sensing optical fiber 200 exceeds a certain threshold value (when it gets brighter). Herein, the transmitting and receiving device is referred to as the interrogator 100.

A positional range on the cable where mask is performed (a starting position and an end position) in (2) is as described with reference to FIGS. 3A and 3B.

As described in the section of Background Art, the synchronization control unit 109 transmits an electric signal for modulation to the modulation unit 104, and issues a command of transmission of the probe light to the optical fiber 200 being a sensing optical fiber via the optical fiber 201 and the optical coupler 211. The modulation unit 104 receives the command, and then transmits the probe light to the optical fiber 200, the probe light being generated by modulating continuous laser light transmitted from the light source unit 103. The backward scattered light as return light enters the optical switch 107a from the optical fiber 200 via the optical coupler 211 and the optical fiber 202. The light passing through the optical switch 107a is detected by the detection unit 105, and an electric signal after the detection is input to the AD conversion unit 108. In this case, operations performed by the AD conversion unit 108 and the processing unit 101 are as described with reference to FIG. 2.

While the mask control unit 111 sets the optical switch 107a in a blocking state, the return light of the backward scattered light generated in the optical fiber 200 in the cable distance from P1 to P2 in FIGS. 3A and 3B does not enter the detection unit 105. Thus, the detection unit 105 does not output a detection signal, and an output from the AD conversion unit 108 is merely noise. Thus, the processing unit 101 is prevented from acquiring information within the blocked cable section.

The synchronization control unit 109 performs the above-mentioned operation every time the modulation unit 104 is caused to transmit the probe light to the optical fiber 200.

It is assumed that the interrogator 100 does not include another means for detecting return light from the optical fiber 200 and performing AD conversion and transmission to an acquisition processing unit.

For this reason, the interrogator 100 in FIG. 4 is not allowed to acquire information with respect to the regulation area.

The optical switch 107a in FIG. 4 may be integrated with another component in the path.

Further, a hardware configuration of the processing unit 101, the synchronization control unit 109, and the mask control unit 111 in FIG. 4 is a computer, for example. In this case, the computer is executed by a program held in advance.

[Effects]

With the configuration described above, the optical fiber sensing system according to the present example embodiment blocks the return light of the probe light for a predetermined time range (period) every time the probe light is transmitted to the sensing optical fiber. For this reason, in the optical fiber sensing system, the information on the range is not acquired. Thus, the optical fiber sensing system is capable of preventing acquisition of the information regarding the cable range where acquisition of information is regulated.

Second Example Embodiment

Next, an interrogator of a second example embodiment is described. In the present example embodiment, signal blocking during a mask period is performed with respect to an electric signal (detection signal) acquired by detecting return light.

Figure 6:
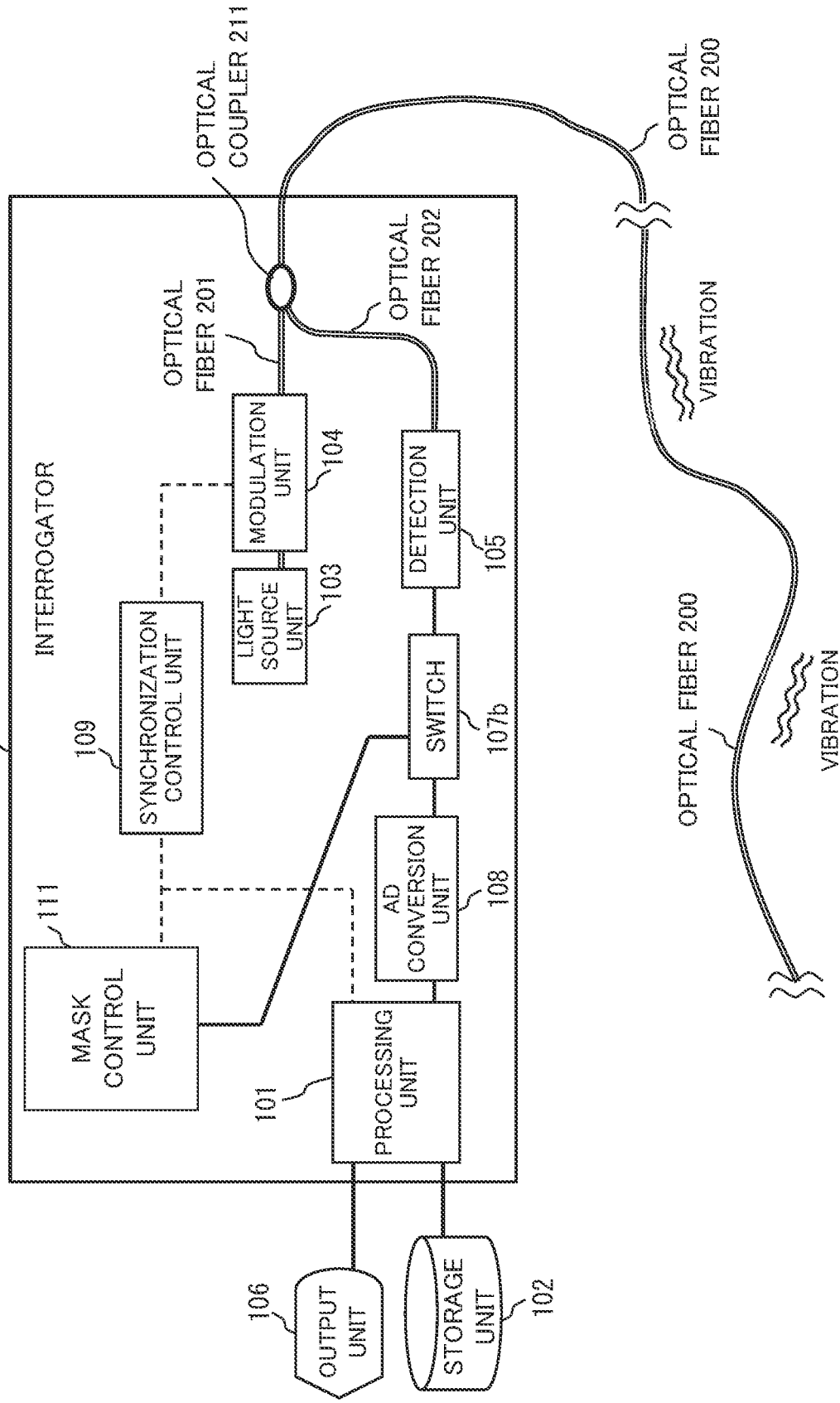
FIG. 6 is a schematic diagram illustrating a configuration example of a DAS system according to a second example embodiment.
Figure 7:
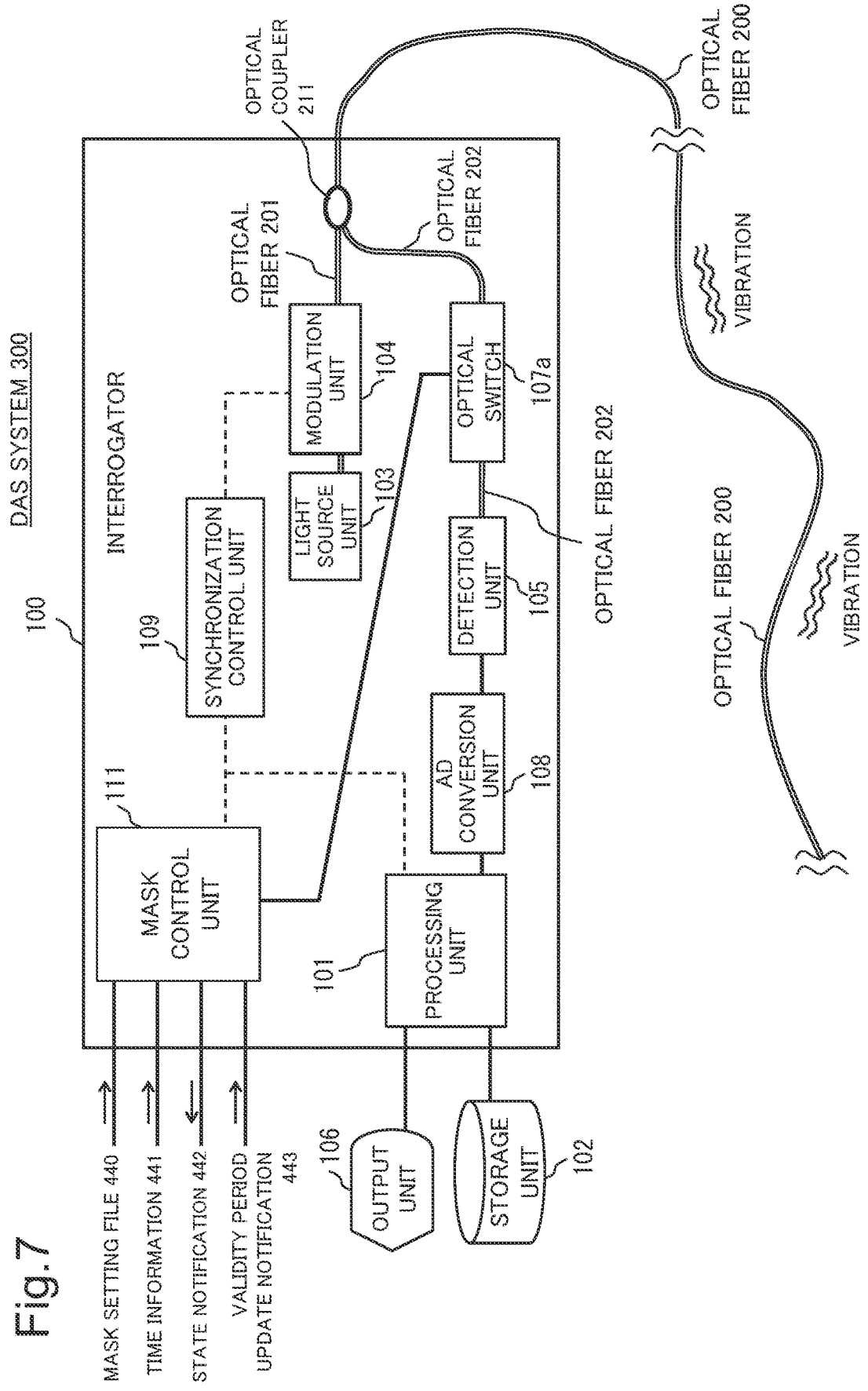
FIG. 7 is a schematic diagram illustrating a configuration example in which an invention according to a third example embodiment is applied to the DAS system according to the first example embodiment.
Figure 8:
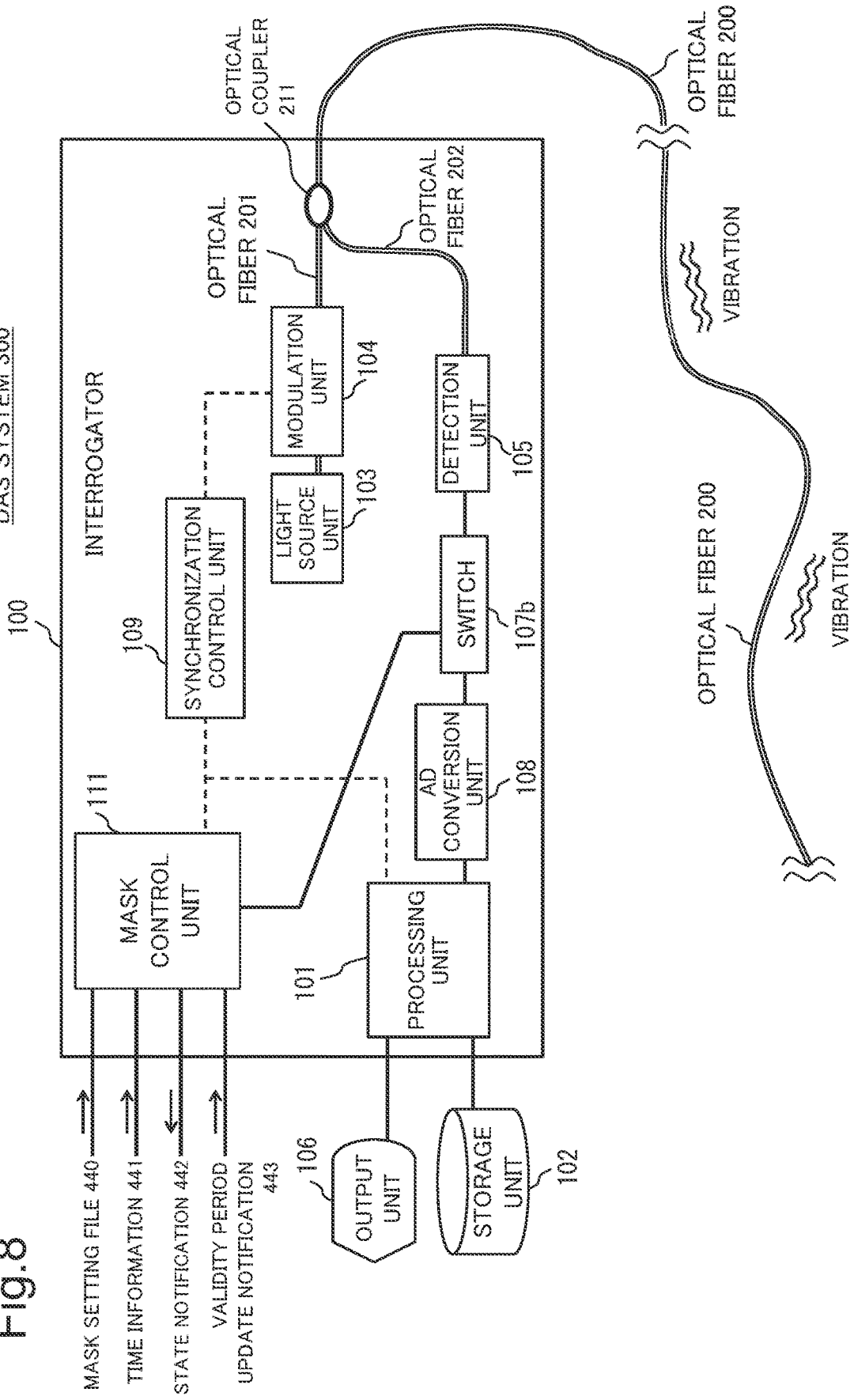
FIG. 8 is a schematic diagram illustrating a configuration example in which the invention according to the third example embodiment is applied to the DAS system according to the second example embodiment.

FIG. 6 is a schematic diagram illustrating a configuration of the DAS system 300 being an example of an optical fiber sensing system that transmits or blocks an electric signal after detection.

The DAS system 300 illustrated in FIG. 6 is acquired by providing an electric switch 107b between the detection unit 105 and the AD conversion unit 108 of the DAS system 300 illustrated in FIG. 2, the electric switch 107b being configured to transmit or block an electric signal. The DAS system 300 illustrated in FIG. 6 is acquired by providing the electric switch 107b in place of the optical switch 107a in the DAS system 300 in the first example embodiment (FIG. 4).

The electric switch 107b is driven by a control signal that is transmitted from the mask control unit 111. The electric switch 107b preferably reacts at high speed. Known examples of the switch that reacts at high speed include a field effect transistor.

FIG. 5 is an explanatory diagram illustrating a timing at which the mask control unit 111 controls the electric switch 107b. The mask control unit 111 receives information indicating a timing of an emission timing of the probe light (time T=0) from the synchronization control unit 109. Subsequently, the mask control unit 111 drives the electric switch 107b in such a way that an input of an electric signal after detection (detection signal) to the AD conversion unit 108 is blocked from the time T=t1 to the time T=t2. Contents regarding the time t1 and the time t2 are similar to those in the first example embodiment, and hence the description therefor is omitted.

The time t1 and the time t2 can be changed by setting the mask, and are set by, for example, causing the interrogator to read a mask setting file (setting information) to be described later. Before reading an effective mask setting file, it is desired that the mask control unit 111 does not let the light pass.

The contents regarding the mask setting items are similar to those in the first example embodiment, and hence the description therefor is omitted.

The operation of transmitting the probe light is similar to that described in the section of Background Art, and hence the description therefor is omitted. The backward scattered light as return light enters the detection unit 105 from the optical fiber 200 via the optical coupler 211 and the optical fiber 202. The detection unit 105 detects the incident return light, and inputs a detection signal being an electric signal after detection to the electric switch 107b. The detection signal having passed through the electric switch 107b is input to the AD conversion unit 108. In this case, the operations performed by the AD conversion unit 108 and the processing unit 101 are as described with reference to FIG. 2.

While the mask control unit 111 sets the electric switch 107b in a blocking state, a signal acquired by detecting the return light of the backward scattered light generated in the optical fiber 200 in the cable distance from P1 to P2 in FIGS. 3A and 3B is not input to the AD conversion unit 108. Thus, the processing unit 101 is not allowed to perform acquisition of information within the blocked cable section.

The synchronization control unit 109 performs the above-mentioned operation every time the modulation unit 104 is caused to transmit the probe light to the optical fiber 200.

It is assumed that the interrogator 100 does not include another means for detecting return light from the optical fiber 200 and performing AD conversion and transmission to a processing unit.

For this reason, the interrogator 100 in FIG. 6 is not allowed to acquire information as to the regulation area.

The electric switch 107*b* in FIG. 6 may be integrated with an output unit of the detection unit 105 or an input unit of the AD conversion unit 108. Further, the electric switch 107*b* in FIG. 6 may have a function of fixing digital output data from the AD conversion unit 108 to a value irrelevant to an input value from the time t1 to the time t2.

A hardware configuration of the processing unit 101, the synchronization control unit 109, and the mask control unit 111 in FIG. 6 is a computer, for example. In this case, the computer is executed by a program held in advance.

Further, the optical fiber sensing system according to the present example embodiment may include both the optical switch 107*a* in FIG. 4 and the associated synchronization control unit 109, and the electric switch 107*b* in FIG. 6 and the associated synchronization control unit 109.

It is desired that the interrogator 100 be covered with a casing or the like that is extremely difficult to open without destroying the inside. For example, it is considered to be effective that a joint of a casing formed of hard-to-cut metal is firmly welded. Further, there is desirably provided a mechanism that cannot be operated after being forcibly opened. This makes it extremely difficult to perform an operation different from the contents in the mask setting file, such as remodeling the switch executing the mask into a passing state at all time regardless of the mask setting.

Moreover, it is needless to mention that the cable including the sensing optical fiber according to the present example embodiment or the first example embodiment may be installed at any location such as an overhead location, a location on land, a location under the ground, a location in the sea, and a location on the sea floor.

[Effects]

With the configuration described above, the optical fiber sensing system according to the present example embodiment blocks the detection signal of the return light of the probe light for a predetermined time range (period) every time the probe light is transmitted to the sensing optical fiber. For this reason, the optical fiber sensing system is not allowed to acquire the information within the positional range associated with the time range. Thus, the optical fiber sensing system is capable of preventing acquisition of the information regarding the cable range where information acquisition is regulated.

Third Example Embodiment

In the example embodiments given above, the section where the mask takes place (mask setting) differs, depending on the installation location of the interrogator 100 in FIG. 4 or 6. It is difficult to set a mask setting section at a factory at a time of shipping of the interrogator 100, and hence the mask setting is required in such a manner that an individual interrogator has a setting according to an installation location of a sensing cable. In other words, it is desired that the interrogator 100 include a mechanism capable of performing mask setting by reading an electric file such as a mask setting file 440, or the like.

However, when the mask setting can be changed freely, there may be a possibility that the interrogator 100 is operated without an appropriate mask setting or with a mask setting unsuitable for sensing regulation. In order to prevent this situation, it is desired that the interrogator 100 include a mechanism that is not allowed to perform sensing unless a mask setting is given according to sensing regulation by a nation, a municipal corporation, or the like.

In view of this, as described below, the present example embodiment is provided with a mechanism that is not allowed to perform monitoring unless an appropriate mask setting is provided to an interrogator.

As measures to solve this problem, the following four solutions are considered.

Firstly, there is provided a mechanism that the interrogator 100 does not perform a monitoring operation unless the interrogator 100 reads and sets the mask setting file 440 that is correct.

Secondly, a measure for preventing manipulation of a mask setting file is taken. For example, when a target submarine cable runs through an exclusive economic zone of a coastal nation, a predetermined public issuing organization 410 generates an encrypted mask setting file 440, based on a mask condition permitted by the coastal nation. Thus, there is provided a mechanism that the public issuing organization 410 issues the file for a monitoring executor 191 who uses the interrogator 100.

Thirdly, the mask setting file is provided with a validity period that is automatically expired when a predetermined period elapses.

Fourthly, a status of use (operation status) of the interrogator 100 is monitored on a regular basis. For example, the interrogator 100 transmits a status of use via communication at a predetermined constant timing to a monitoring server 500 for the monitoring. The monitoring server 500 automatically checks whether the interrogator 100 is used in an unauthorized manner, and notifies the interrogator 100 of extension of the validity period of the mask setting file only when no problem is found. When the updating of the validity time is not received, the interrogator 100 does not perform the monitoring operation with the optical fiber sensing after the validity period.

Details of those mechanisms are described below.

Issue and Management of Mask Setting File

Figure 9:
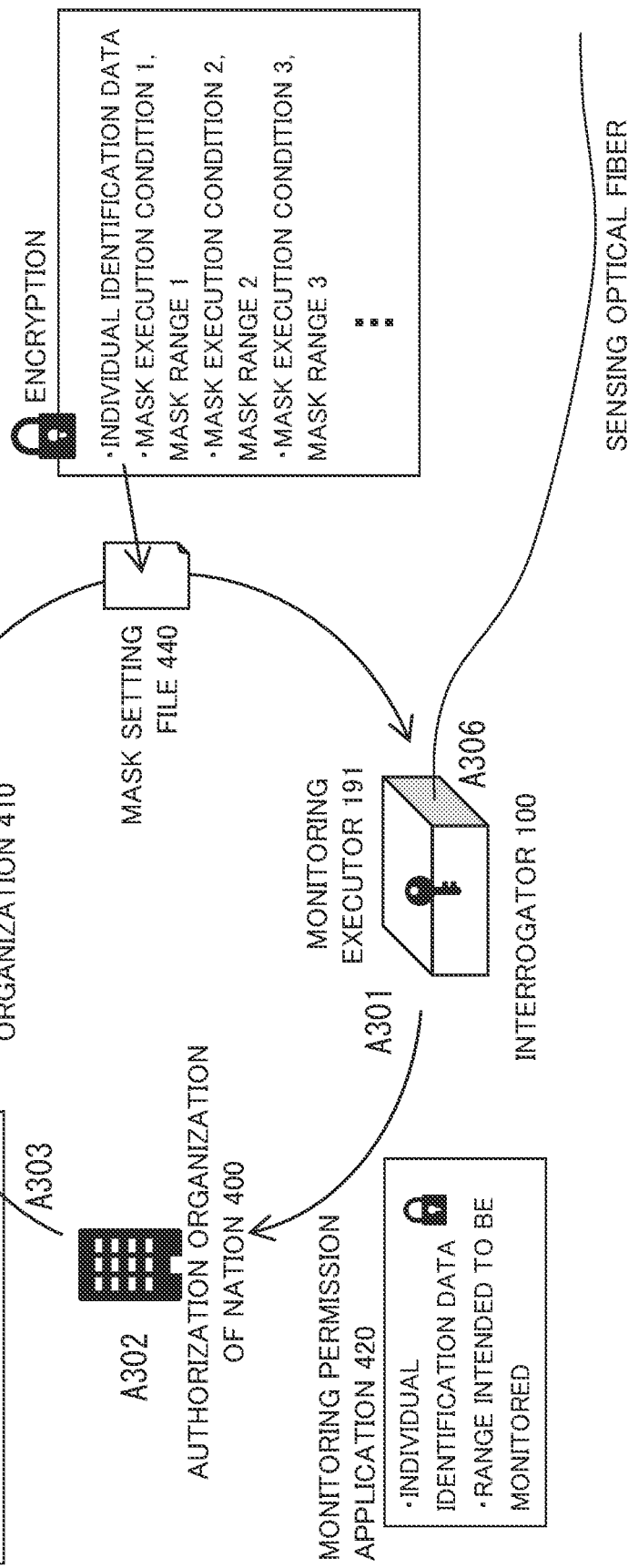
FIG. 9 is an explanatory diagram illustrating a flow from application for monitoring to delivery of a mask setting file.

FIG. 9 is a diagram explaining a flow from application to issuing of a mask setting file.

First, as an action A301, the monitoring executor 191 that uses fiber sensing applies for monitoring permission to those who manage monitoring activities in a section subjected to monitoring with a cable, for example, to an authorization organization 400 of the government of the coastal nation (nation). For example, a monitoring permission application 420, which is an application therefor, contains individual identification data relating to the interrogator 100 and route coordinates of the cable connected to the interrogator, in other words, information relating to a section intended to be monitored. Herein, for example, it is desired that the individual identification data be encrypted for falsification prevention. For example, the encrypted data contain a manufacturing serial number, a Media Access Control (MAC) address, and the like of the interrogator 100.

As an action A302, the authorization organization 400 examines and investigates the application regarding monitoring, and determines whether to grant the permission and authorization. In a case where, although a regulation section is partially included, the monitoring is permitted as a determination result on condition that a mask is set in an appropriate manner, the public issuing organization 410 that is trust-worthy is requested to issue a mask setting file as an action A303. A mask setting file issue request 430, which is a request form relating to the request, contains the individual identification data and information relating to the mask condition. Further, in some cases, no action for monitoring is permitted at all as a determination result. In this case, it is assumed that the authorization organization 400 notifies the monitoring executor 191 of the result.

As an action A304, the public issuing organization 410 generates the encrypted mask setting file 440 in which the mask setting under the issue request is described. Subsequently, as an action A305, the public issuing organization 410 transmits the mask setting file 440 to the monitoring executor.

As an action A306, the monitoring executor 191 causes the interrogator 100 to read the encrypted mask setting file 440. The interrogator 100 is provided with a decoding key in advance. Thus, the interrogator 100 decodes the read mask setting file 440, confirms that the individual identification data match with the own data, and performs the mask setting described in the mask setting file 440. With this, the interrogator 100 is allowed to perform a monitoring operation for the cable within the permitted range.

As can be understood from the above-given description, the mask setting file 440 may be referred to as a monitoring permit in another way of expression. This is because the mask setting file 440 has a function of setting a mask for acquired information on a regulation section and allowing monitoring within an application section other than the regulation section.

For example, techniques of an electronic signature and an electronic certificate may be used for encryption and decryption of electric information. These techniques are publicly known, and are disclosed in NPL 2, for example.

In any one of the application from the monitoring permission application 420, the request with the mask setting file issue request 430, and the provision of the mask setting file 440, which are described above, main information is generally provided as electronic data.

[Management of Proper Use]

A problem may be caused when a mask setting file that is once issued properly is effective for an indefinite time. This is because, for example, there may be a risk that an interrogator for which a looser mask condition has been set is sold and is used at another location for another purpose. In order to prevent the problem, it is effective to establish a mechanism in which the mask setting file is provided with a validity period and the validity period is automatically updated at a predetermined interval.

In order to prevent illegal acquisition of information through a resale of an interrogator or the like, the validity period is preferably shorter. However, the procedure as illustrated in FIG. 9 includes manual work such as determination of permission and authorization for monitoring, and hence it is predicted that several days are required in general. Thus, when the validity period is shortened, and update frequency for the mask setting file 440 is lowered, a work load is excessively increased, which may cause a problem. Therefore, it is assumed that the validity period is generally one year or longer and cannot be too short.

In order to solve this problem, it is desired to include a mechanism of automatically performing monitoring for proper use in a short regular cycle. In view of this, there is provided a mechanism for automatic confirmation of validity via a network, which is described below with reference to FIG. 10.

Figure 10:
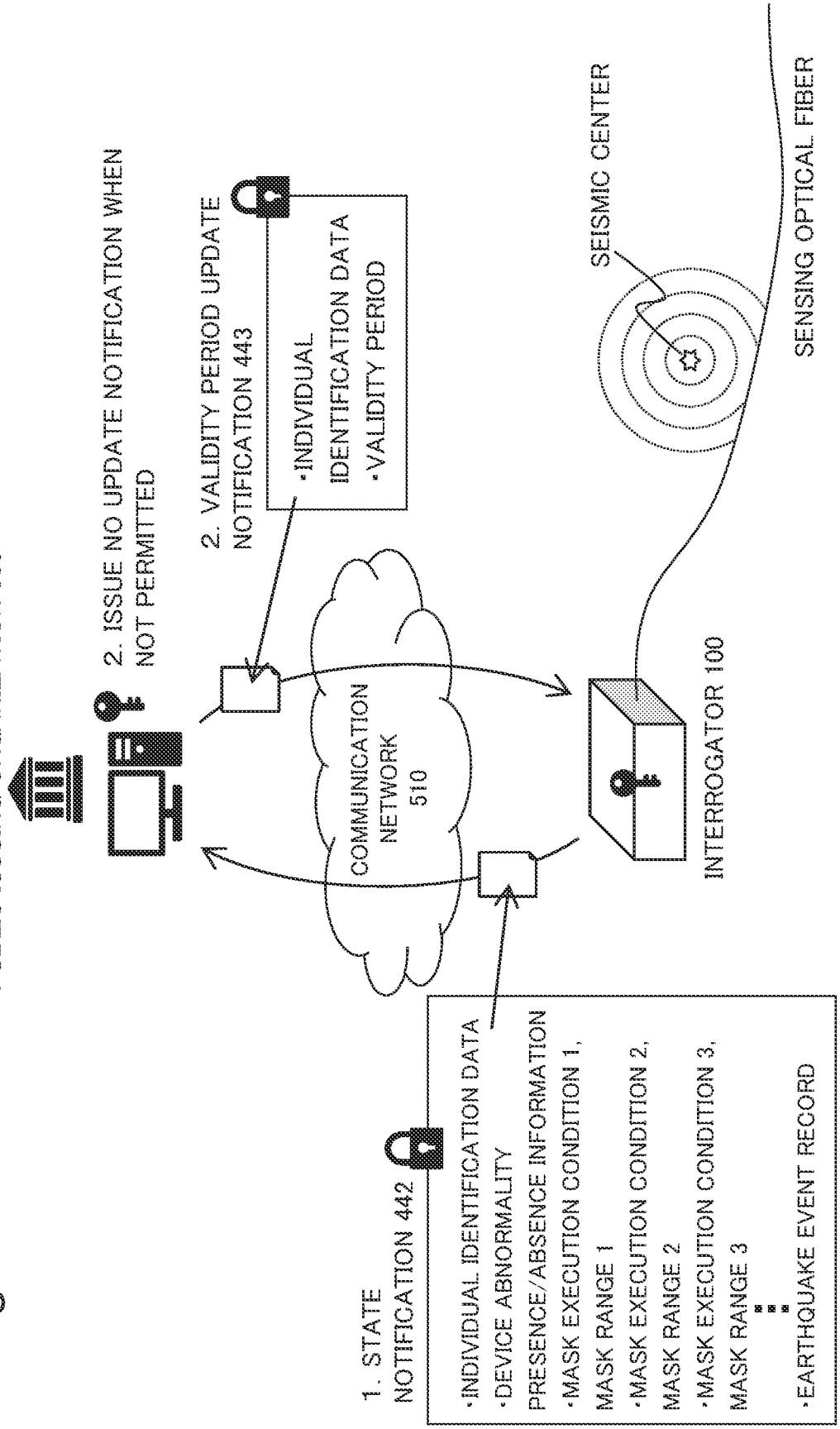
FIG. 10 is an explanatory diagram illustrating a method of monitoring unauthorized use, which is performed automatically.

With reference to FIG. 10, description is made on the mechanism for automatic confirmation of validity via a network.

The interrogator 100 automatically performs a regular notification 442 with the monitoring server 500 connected thereto via a communication network 510. For example, the communication is performed on a regular basis. In general, the organization that issues the mask setting file operates the monitoring server 500, and is capable of holding or referring to contents in the latest mask setting file of each interrogator.

The interrogator 100 performs the notification 442 to the monitoring server 500 at a predetermined timing, transmitting the individual identification data, the information indicating the contents of the mask setting, and information indicating a current management status or an operation status. The monitoring server 500 also holds the mask setting information. Thus, the interrogator 100 may determine a hash function capable of detecting falsification, such as a checksum value or a hash value of the mask setting information, in advance with the monitoring server 500, and may transmit the hash value to the monitoring server 500.

Further, when it is automatically determined that the interrogator 100 is used properly, based on the information 442 transmitted from the interrogator 100, the monitoring server 500 performs a notification 443 of extension of the validity period of the mask setting file to the interrogator 100. In contrast, when it is determined that the interrogator 100 is used improperly or strengthening of the regulation is required, the monitoring server 500 does not extend the validity period of the mask setting file. When the interrogator 100 does not receive the notification 443 indicating extension of the validity period from the monitoring server 500, the validity period is expired, and acquisition of the information with optical fiber sensing cannot be performed.

The mechanism in FIG. 10 is merely for confirming whether each interrogator is used in a permitted way, and is not for re-examining the mask setting contents themselves. Thus, rapid determination and response can be performed automatically.

Even when the monitoring method as in FIG. 10 is used on a regular basis, there still remains a risk of falsification of an installation location of the interrogator 100. For example, an interrogator that acquires a mask setting file by applying for monitoring in a location without regulation may be brought into a location with regulation to perform monitoring. Thus, it is desired that a mechanism of remotely monitoring that the interrogator 100 is used at a permitted location be included.

For example, utilization of earthquake events is considered as one of the methods of confirming that the interrogator is used at a permitted location. Almost all pieces of information relating to earthquakes that occur on the Earth with a certain magnitude or greater are recorded and released to the public. Further, an impact of an earthquake wave is locally present with a limited speed, and hence a detection time is clearly delayed in substantially proportional to a distance from a seismic center. Based on this fact, data indicating an earthquake event detected by each interrogator have a function similar to a "finger print" at a location at which the cable is laid. It can be confirmed whether an installation route of a cable matches with an applied route for permission and authorization, based on comparison between a detection result of an earthquake event sensed by the cable and released earthquake data.

When the number of earthquake event records to be compared with each other is one, a risk of erroneous determination remains, and hence it is desired that a plurality of events be used for comparison.

For example, utilization of a sound of a thunder is considered as another confirmation means for confirming whether the interrogator is used at a permitted location. This is because a location and a time of a thunder are released to the public, which can be used as comparison data.

Alternatively, a sound or vibration is artificially generated to create an event, and a generation time and a generation location of the event record can be used for comparison. This method is particularly effective when a monitoring range is not too broad.

[Additional Constituent Element of Interrogator]

The mechanisms that are added to the interrogator 100 in the third example embodiment are described with comparison between FIGS. 4 and 7, and FIGS. 6 and 8. An input of the mask setting file 440 is for enabling setting of a mask with a required condition according to individual interrogators. In a case of a sensing (monitoring) device, time information 441 is information that is necessarily required for keeping a record indicating a type of sensing data and an acquisition time of the sensing data. In general, an input of the time information 441 is supplied from a device that receives an electric wave from a Global Navigation Satellite System (GNSS) satellite and supplies highly accurate time information. Thus, although not illustrated in the first example embodiment and the second example embodiment, inputs of the mask setting file 440 and the time information 441 are necessarily implemented.

Further, in the third example embodiment, an input of the time information 441 is necessary for achieving the mechanism of forbidding a sensing operation after expiration of the validity period. It is desired that the interrogator 100 include the mechanism of forbidding a sensing operation when the proper time information 441 is not present. Further, a plurality of inputs of the time information 441 may be provided in such a way to deal with a failure of a time information supply device.

An output of the state notification 442 and an input of the validity period update notification 443 are communication for managing proper use, which is described with reference to FIG. 10. Communication to the mask processing unit 111 described above does not need to be separated in a physical sense, and may be integrated to one Ethernet (registered trademark) interface port, for example.

Further, at the time of shipping from a factory, the interrogator 100 stores an unillustrated encryption key for performing unauthorized-alteration prevention communication with the public issuing organization 410 and the monitoring server 500. Individual identification information is described in an encrypted form at the time of communication, and the interrogator 100 being a different individual body is not activated even when the same communication message is input thereto. The mechanism described above is implemented in the mask control unit 111 of the interrogator 100.

[Effects]

With the monitoring method according to the present example embodiment, the trust-worthy public organization can assure that the regulation section is not monitored by the interrogator. Thus, even in a case of optical fiber sensing using a cable partially running through a regulation section, a possibility of permitting acquisition of sensing information outside the regulation section arises.

In the description given above, a case in which the optical fiber sensing method is DAS has been described. However, the optical fiber sensing method according to the example embodiment is not limited to DAS, and may be any method referred to as a different name as long as the OTDR method is employed. Examples of the method referred to as a different name include DVS, DTS, BOTDR, and OTDR.

Herein, DVS is an abbreviation for distributed vibration sensing. DTS is an abbreviation for distributed temperature sensing. BOTDR is an abbreviation for Brillouin optical time-domain reflectometry.

Figure 11:
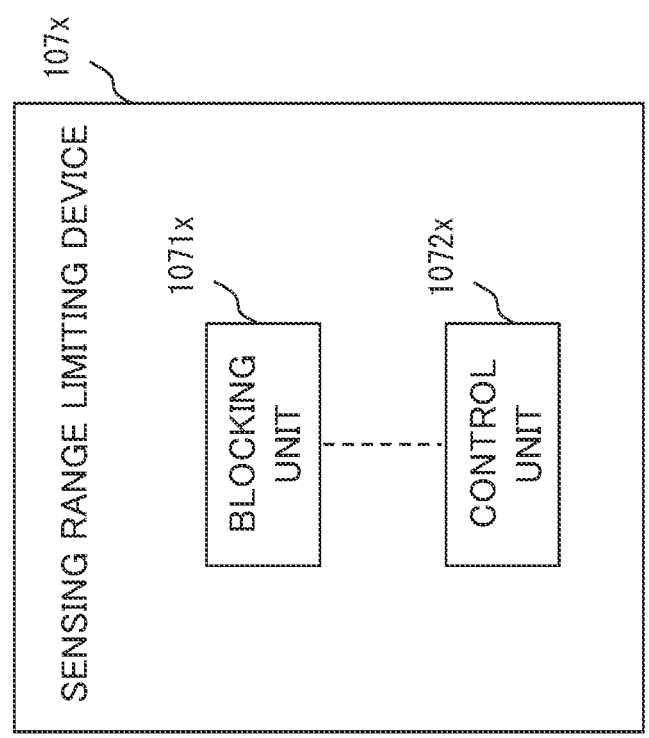
FIG. 11 is a block diagram illustrating a minimum configuration of a sensing range limiting device according to the example embodiment.

FIG. 11 is a block diagram illustrating a configuration of a sensing range limiting device 107x, which is a minimum configuration of a sensing range limiting device according to the example embodiment. The sensing range limiting device 107x includes a blocking unit 1071x and a control unit 1072x.

The blocking unit 1071x blocks transmission of return light to a light detection unit or transmission of a detection signal to a downstream processing unit, the detection signal being a signal detected with respect to the return light, based on a control signal for a predetermined period. The return light is relevant to probe light transmitted to an optical fiber used for optical fiber sensing, and is from the optical fiber. The predetermined period includes a period for which acquisition of information from the detection signal is forbidden or a period associated with a positional range for which the acquisition is undesirable.

The control unit 1072x outputs the control signal to the blocking unit 1071x.

With this, the sensing range limiting device 107x blocks entry of the return light or an input of the detection signal within the positional range associated with the period. The sensing range limiting device 107x is capable of preventing acquisition of optical fiber sensing data within the positional range for which acquisition is undesirable at an original signal stage.

Thus, with the above configuration, the sensing range limiting device 107x exerts the effects described in the section of [Advantageous Effects].

Each of the example embodiments of the present invention has been described above, but the present invention is not limited to the above-mentioned example embodiments, and further modifications, replacement, and adjustment can be added without departing from the basic technical idea of the present invention. For example, the configurations of the elements illustrated in each of the drawings are merely examples for assisting understanding of the present invention, and are not intended to provide limitations to those configurations illustrated in the drawings.

The whole or part of the example embodiments described above can be described as, but not limited to, the following supplementary notes.

(Supplementary Note 1)

A sensing range limiting device including:

a blocking means for blocking transmission of return light to a light detection means or transmission of a detection signal to a downstream processing means, based on a control signal for a predetermined period, the return light being relevant to probe light being transmitted to an optical fiber to be used for optical fiber sensing and being from the optical fiber, the detection signal being a signal detected with respect to the return light; and a control means for outputting the control signal to the blocking means, wherein the predetermined period includes a period for which acquisition of information from the detection signal is forbidden or a period associated with a positional range for which the acquisition is undesirable.

(Supplementary Note 2)

The sensing range limiting device according to Supplementary Note 1, wherein,
the predetermined period is defined as a time elapsed from a time original point with an emission timing of the probe light as the time original point.

(Supplementary Note 3)

The sensing range limiting device according to Supplementary Note 1 or 2, wherein the blocking means performs the blocking every time the transmission is performed.

(Supplementary Note 4)

The sensing range limiting device according to any one of Supplementary Notes 1 to 3, wherein the blocking means is an optical switch provided between the optical fiber and a part in which the detection is performed.

(Supplementary Note 5)

The sensing range limiting device according to Supplementary Note 4, wherein the control means turns the optical switch into a state of the blocking when the period starts.

(Supplementary Note 6)

The sensing range limiting device according to Supplementary Note 5, wherein the control means turns the optical switch into a light transmission state when the period ends.

(Supplementary Note 7)

The sensing range limiting device according to any one of Supplementary Notes 1 to 3, wherein the blocking means is an electric switch provided downstream of a part in which the detection is performed.

(Supplementary Note 8)

The sensing range limiting device according to Supplementary Note 7, wherein the control means turns the electric switch into a state of the blocking when the period starts.

(Supplementary Note 9)

The sensing range limiting device according to Supplementary Note 8, wherein the control means turns the electric switch into a state of transmitting the detection signal when the period ends.

(Supplementary Note 10)

The sensing range limiting device according to any one of Supplementary Notes 1 to 9, wherein
setting of one or more pieces of first combination information is enabled, the first combination information being information indicating a combination of a target range and an execution condition, the target range being the positional range for which blocking processing being processing for the blocking to be performed by the control means is performed, the execution condition being a condition under which the blocking processing is performed for the positional range being predetermined.

(Supplementary Note 11)

The sensing range limiting device according to Supplementary Note 10, wherein
a change of the first combination information is enabled.

(Supplementary Note 12)

The sensing range limiting device according to Supplementary Note 11, wherein
the execution condition is a designated period being a period at all times or a designated period.

(Supplementary Note 13)

The sensing range limiting device according to Supplementary Note 12, wherein
the execution condition is based on information on an external factor.

(Supplementary Note 14)

A receiving device including: the sensing range limiting device according to any one of Supplementary Notes 11 to 13; and a detection means for performing the detection.

(Supplementary Note 15)

A transmitting and receiving device including: the receiving device according to Supplementary Note 14; and a transmitting device that performs the transmission.

(Supplementary Note 16)

The transmitting and receiving device according to Supplementary Note 15, further including a processing means for deriving acquired information from the detection signal.

(Supplementary Note 17)

The transmitting and receiving device according to Supplementary Note 16, wherein the acquired information is information indicating an environment surrounding the optical fiber.

(Supplementary Note 18)

A transmitting and receiving device including:
the receiving device according to Supplementary Note 14; and a transmitting device that performs the transmission, wherein
the acquisition is prevented from being performed unless predetermined setting information within a validity period is input, and
the setting information is information including the first combination information.

(Supplementary Note 19)

The transmitting and receiving device according to Supplementary Note 18, wherein
the setting information includes individual identification information being information enabling identification of the transmitting and receiving device, the individual identification information being subjected to second encryption, and is effective only in the transmitting and receiving device having the individual identification information.

(Supplementary Note 20)

The transmitting and receiving device according to Supplementary Note 18 or 19, wherein
the setting information includes, in a state after being subjected to third encryption, information for designating prevention of acquisition of acquired data being data acquired through the optical fiber sensing within the target range for which the optical fiber sensing is regulated, the target range being present on an installation route of the optical fiber.

(Supplementary Note 21)

The transmitting and receiving device according to Supplementary Note 20, wherein
the transmitting and receiving device transmits second combination information to a monitoring server, the second combination information being a combination of information indicating the setting information being set to an own transmitting and receiving device, and operation status information being information indicating at least a part of an operation status of the own transmitting and receiving device,
the monitoring server transmits, when the setting information indicated by the information indicating the setting information and the operation status information establish a predetermined relationship, notification information to the transmitting and receiving device, the notification information being subjected to fourth encryption and indicating extension of the validity period, and
the transmitting and receiving device extends, when confirming that the notification information is addressed to the own transmitting and receiving device, the validity period of the setting information and continues the optical fiber sensing.

(Supplementary Note 22)

The transmitting and receiving device according to Supplementary Note 21, wherein
the operation status information is the acquired data or event identification data acquired by identifying an event from the acquired data, relating to a sound or vibration whose location and time are specifiable from other recording information that is released to the public, and the monitoring server monitors whether a use location is proper by comparing the acquired data or the event identification data with the recording information.

(Supplementary Note 23)

The transmitting and receiving device according to Supplementary Note 22, wherein
the sound or vibration whose location and time are specifiable is an earthquake.

(Supplementary Note 24)

The transmitting and receiving device according to Supplementary Note 22, wherein
the sound or vibration whose location and time are specifiable is a sound of a thunder when it thunders.

(Supplementary Note 25)

The transmitting and receiving device according to any one of Supplementary Notes 14 to 17, wherein, when predetermined setting information within a validity period is not held, the optical fiber sensing is prevented from being performed, and the setting information includes at least information associated with a position of the optical fiber for which the blocking is performed.

(Supplementary Note 26)

The transmitting and receiving device according to Supplementary Note 25, wherein
the setting information includes: individual identification information enabling identification of an individual of an own transmitting and receiving device; information indicating a regulation content for the optical fiber sensing, the regulation content being defined by those who manage activities of the optical fiber sensing with respect to a section of a cable that includes the optical fiber being connected to the own transmitting and receiving device; and information indicating a validity period of the setting information, and the setting information is encrypted.

(Supplementary Note 27)

The transmitting and receiving device according to Supplementary Note 25, wherein operation status information is transmitted to a server for monitoring via a network, the operation status information being information indicating at least a part of an operation status of an own transmitting and receiving device, and
the server is configured to monitor the operation status, based on the operation status information.

(Supplementary Note 28)

The transmitting and receiving device according to any one of Supplementary Notes 14 to 27, wherein the transmitting and receiving device is a distributed acoustic sensing interrogator.

(Supplementary Note 29)

An optical fiber sensing system including: the transmitting and receiving device according to any one of Supplementary Notes 14 to 27; and a cable including the optical fiber, wherein the optical fiber sensing system is a distributed acoustic sensing system.

(Supplementary Note 30)

A monitoring server being the server that notifies the transmitting and receiving device according to Supplementary Note 27 of extension of the validity period when the operation status information transmitted from the transmitting and receiving device and the setting information assigned to the transmitting and receiving device establish a predetermined relationship.

(Supplementary Note 31)

The monitoring server according to Supplementary Note 30, wherein, in a case where an artificial sound or vibration is applied at a set position being a preset position of a cable including the optical fiber at a set time being a preset time, when the set time and the set position, and a detection time and a detection position of the artificial sound or vibration in the operation status information that is acquired through the optical fiber sensing match with each other, the notification is performed.

(Supplementary Note 32)

The monitoring server according to Supplementary Note 31, wherein, when an occurrence time and an occurrence location of a sound or vibration generated by a natural phenomenon that is separately observed, and a detection time and a detection position of a sound or vibration in the operation status information that is acquired through the optical fiber sensing and generated by a natural phenomenon match with each other, the notification is performed.

(Supplementary Note 33)

The monitoring server according to Supplementary Note 32, wherein the natural phenomenon is an earthquake or a lightning strike.

(Supplementary Note 34)

An optical fiber sensing range limiting method, including:
blocking transmission of return light to a light detection means or transmission of a detection signal to a downstream processing means, for a predetermined period, the return light being relevant to probe light transmitted to an optical fiber to be used for optical fiber sensing and being from the optical fiber, the detection signal being a signal detected with respect to the return light.

(Supplementary Note 35)

The optical fiber sensing range limiting method according to Supplementary Note 34, wherein
the predetermined period is defined as a time elapsed from a time original point with an emission timing of the probe light as the time original point.

(Supplementary Note 36)

The optical fiber sensing range limiting method according to Supplementary Note 34 or 35, wherein setting of the period or information associated to the period is performed by setting information being encrypted information for the setting.

(Supplementary Note 37)

The optical fiber sensing range limiting method according to Supplementary Note 36, wherein the setting information is acquired from a designated organization that is designated by a nation.

(Supplementary Note 38)

The optical fiber sensing range limiting method according to Supplementary Note 37, wherein a status of application of the setting information is confirmed by a confirmation organization via a network.

(Supplementary Note 39)

The optical fiber sensing range limiting method according to Supplementary Note 38, wherein the confirmation organization is the designated organization.

(Supplementary Note 40)

An optical fiber sensing range limiting program causing a computer to execute processing of blocking transmission of return light to a light detection means or transmission of a detection signal to a downstream processing means, for a predetermined period, the return light being relevant to probe light transmitted to an optical fiber to be used for optical fiber sensing and being from the optical fiber, the detection signal being a signal detected with respect to the return light.

(Supplementary Note 41)

The optical fiber sensing range limiting program according to Supplementary Note 40, wherein
the predetermined period is defined as a time elapsed from a time original point with an emission timing of the probe light as the time original point.

(Supplementary Note 42)

The optical fiber sensing range limiting program according to Supplementary Note 40 or 41, wherein setting of the period or information associated to the period is performed by setting information being encrypted information for the setting.

(Supplementary Note 43)

The optical fiber sensing range limiting program according to Supplementary Note 42, wherein the setting information is acquired from a designated organization that is designated by a nation.

(Supplementary Note 44)

The optical fiber sensing range limiting program according to Supplementary Note 43, wherein a status of application of the setting information is confirmed by a confirmation organization via a network.

(Supplementary Note 45)

The optical fiber sensing range limiting program according to Supplementary Note 44, wherein the confirmation organization is the designated organization.

The control signal in Supplementary Notes described above is, for example, the control signal transmitted from the mask control unit 111 in FIG. 4 to the optical switch 107a or the control signal transmitted from the mask control unit 111 in FIG. 6 to the electric switch 107b. Further, the optical fiber sensing is, for example, the optical fiber sensing performed by the interrogator 100 in FIG. 4 or FIG. 6.

Further, the optical fiber is, for example, the optical fiber 200 in

FIG. 4 or FIG. 6. Further, the probe light is, for example, the probe light transmitted from the modulation unit 104 in FIG. 4 or FIG. 6 to the optical fiber 200. Further, the return light is, for example, the return light entering the detection unit 105 from the optical fiber 200 in FIG. 4 or FIG. 6 via the optical fiber 202.

Further, the detection signal is, for example, the detection signal being output from the detection unit 105 in FIG. 4 or FIG. 6. Further, the blocking means is, for example, the optical switch 107a in FIG. 4 or the electric switch 107b in FIG. 6.

Further, the control means is, for example, the mask control unit 111 in FIG. 4 or FIG. 6.

Further, the sensing range limiting device is, for example, the combination of the mask control unit 111 and the optical switch 107a in FIG. 4 or the combination of the mask control unit 111 and the electric switch 107b in FIG. 6. Further, the detection means is, for example, the detection unit 105 in FIG. 4 or FIG. 6. Further, the optical switch is, for example, the optical switch 107a in FIG. 4.

Further, the transmitting device is, for example, the combination of the synchronization control unit 109, the light source unit 103, and the modulation unit 104 in FIG. 4 or FIG. 6. Further, the transmitting and receiving device is, for example, the interrogator 100 in FIG. 4 or FIG. 6. Further, the processing means is, for example, the processing unit 101 in FIG. 4 or FIG. 6.

Further, the optical fiber is, for example, the optical fiber 200 in FIG. 4 or FIG. 6.

Further, the probe light is, for example, the probe light transmitted from the modulation unit 104 in FIG. 4 or FIG. 6 to the optical fiber 200. Further, the return light is, for example, the return light entering the detection unit 105 from the optical fiber 200 in FIG. 4 or FIG. 6 via the optical fiber 202.

Further, the second encryption is, for example, the encryption to which the mask setting file 440 in FIG. 9 is subjected. Further, the individual identification information is, for example, the individual identification data in FIG. 9. Further, the third encryption is the encryption to which the state notification 442 in FIG. 10 is subjected. Further, the operation status information is, for example, the information transmitted from the state notification 442 in FIG. 10.

Further, the server for monitoring is, for example, the monitoring server 500 in FIG. 10. Further, the fourth encryption is, for example, the encryption performed at the time of the validity period update notification in FIG. 10. Further, the notification information is, for example, the information transmitted at the time of the validity period update notification in FIG. 10.

Further, the other recording information is, for example, the information relating to an earthquake or the information indicating a location and a time of a thunder, which is described in the example embodiment. Further, the distributed acoustic sensing interrogator is, for example, the interrogator 100 in FIG. 4 or FIG. 6. Further, the distributed acoustic sensing system is, for example, the DAS system 300 in FIG. 4 or FIG. 6.

Further, the optical fiber sensing range limiting program is, for example, the program for causing the computer included in the interrogator 100 in FIG. 4 or FIG. 6 to execute processing.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2020-013945, filed on Jan. 30, 2020, the disclosure of which is incorporated herein in its entirety by reference.

REFERENCE SIGNS LIST

100 Interrogator
101 Processing unit
102 Storage unit
103 Light source unit
104 Modulation unit
105 Detection unit
106 Output unit
107a Optical switch
107b Electric switch
107x Sensing range limiting device
1071x Blocking unit
1072x Control unit
108 AD conversion unit 109 Synchronization control unit
111 Mask control unit
191 Monitoring executor
200, 201, 202 Optical fiber
211 Optical coupler
300 DAS system
400 Authorization organization
410 Public issuing organization
420 Monitoring permission application
430 Mask setting file issue request
440 Mask setting file
441 Time information
442 State notification
443 Validity period update notification
500 Monitoring server
801, 802 Backward scattered light
900 Probe light

What is claimed is:

1. A sensing range limiting device comprising:
a blocking unit configured to block transmission of return light to a light detection unit or transmission of a detection signal to a downstream processing unit, based on a control signal, for a predetermined period, the return light being relevant to probe light being transmitted to an optical fiber to be used for optical fiber sensing and being from the optical fiber, the detection signal being a signal detected with respect to the return light; and
a control unit configured to output the control signal to the blocking unit,
wherein
in case where the blocking unit blocks the transmission of the return light to the light detection unit, the predetermined period includes a period during which the return light from a regulation area, the regulation area being a section of the optical fiber in which acquisition of information on the optical fiber sensing is regulated, is input to the blocking unit, and
in case where the blocking unit blocks the transmission of the detection signal to the downstream processing unit, the predetermined period includes a period during which the detection signal obtained by detecting the return light from the regulation area is input to the blocking unit.

2. The sensing range limiting device according to claim 1, wherein
the predetermined period is defined as a time elapsed from a time original point with an emission timing of the probe light as the time original point.

3. The sensing range limiting device according to claim 1, wherein the blocking unit performs the blocking every time the transmission is performed.

4. The sensing range limiting device according to claim 1, wherein the blocking unit is an optical switch provided between the optical fiber and a part in which the detection is performed.

5. The sensing range limiting device according to claim 4, wherein the control unit turns the optical switch into a state of the blocking when the period starts.

6. The sensing range limiting device according to claim 5, wherein the control unit turns the optical switch into a light transmission state when the period ends.

7. The sensing range limiting device according to claim 1, wherein the blocking unit is an electric switch provided downstream of a part in which the detection is performed.

8. The sensing range limiting device according to claim 7, wherein the control unit turns the electric switch into a state of the blocking when the period starts.

9. The sensing range limiting device according to claim 8, wherein the control means turns the electric switch into a state of transmitting the detection signal when the period ends.

10. The sensing range limiting device according to claim 1, wherein
setting of one or more pieces of first combination information is enabled, the first combination information being information indicating a combination of a target range and an execution condition, the target range being the positional range for which blocking processing being processing for the blocking to be performed by the control unit is performed, the execution condition being a condition under which the blocking processing is performed for the positional range being predetermined.

11. A transmitting and receiving device comprising:
a receiving device; and a transmitting device that performs the transmission, wherein
the receiving device includes a sensing range limiting device and a detection unit configured to perform the detection, wherein
the sensing range limiting device includes
a blocking unit configured to block transmission of return light to a light detection unit or transmission of a detection signal to a downstream processing unit, based on a control signal, for a predetermined period, the return light being relevant to probe light being transmitted to an optical fiber to be used for optical fiber sensing and being from the optical fiber, the detection signal being a signal detected with respect to the return light; and
a control unit configured to output the control signal to the blocking unit, wherein
in case where the blocking unit blocks the transmission of the return light to the light detection unit, the predetermined period includes a period during which the return light from a regulation area, the regulation area being a section of the optical fiber in which acquisition of information on the optical fiber sensing is regulated, is input to the blocking unit, and
in case where the blocking unit blocks the transmission of the detection signal to the downstream processing unit, the predetermined period includes a period during which the detection signal obtained by detecting the return light from the regulation area is input to the blocking unit, wherein
setting of one or more pieces of first combination information is enabled, the first combination information being information indicating a combination of a target range and an execution condition, the target range being the positional range for which blocking processing being processing for the blocking to be performed by the control unit is performed, the execution condition being a condition under which the blocking processing is performed for the positional range being predetermined, wherein
a change of the first combination information is enabled, wherein
the acquisition is prevented from being performed unless predetermined setting information within a validity period is input, and
the setting information is information including the first combination information.

12. The transmitting and receiving device according to claim 11, wherein
the setting information includes individual identification information being information enabling identification of the transmitting and receiving device, the individual identification information being subjected to second encryption, and is effective only in the transmitting and receiving device having the individual identification information.

13. The transmitting and receiving device according to claim 11, wherein
the setting information includes, in a state after being subjected to third encryption, information for designating prevention of acquisition of acquired data being data acquired through the optical fiber sensing within the target range for which the optical fiber sensing is regulated, the target range being present on an installation route of the optical fiber.

14. The transmitting and receiving device according to claim 13, wherein
the transmitting and receiving device transmits second combination information to a monitoring server, the second combination information being a combination of information indicating the setting information being set to an own transmitting and receiving device, and operation status information being information indicating at least a part of an operation status of the own transmitting and receiving device, the monitoring server transmits, when the setting information indicated by the information indicating the setting information and the operation status information establish a predetermined relationship, notification information to the transmitting and receiving device, the notification information being subjected to fourth encryption and indicating extension of the validity period, and the transmitting and receiving device extends, when confirming that the notification information is addressed to the own transmitting and receiving device, the validity period of the setting information and continues the optical fiber sensing.

* * * * *